Feb. 15, 1966    O. W. LE GATE ETAL    3,235,008
WELL TREATING APPARATUS
Filed April 24, 1963    2 Sheets-Sheet 1
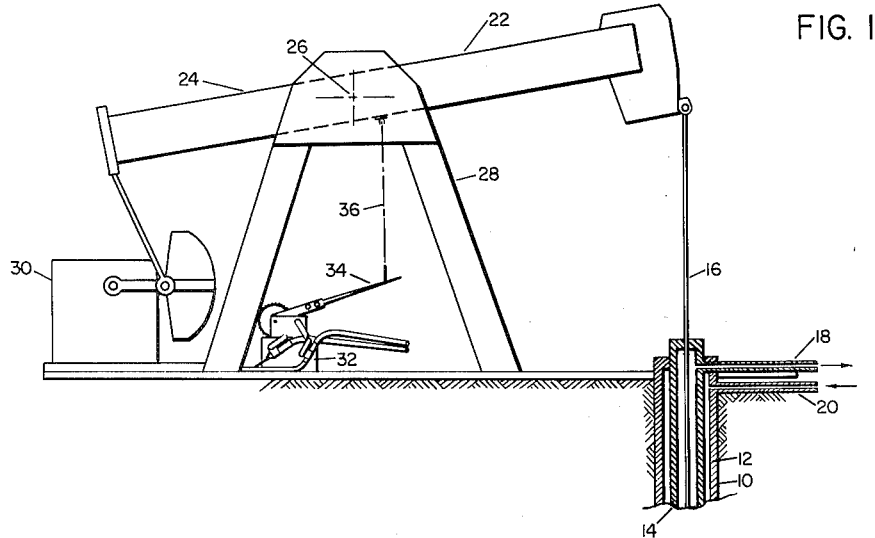
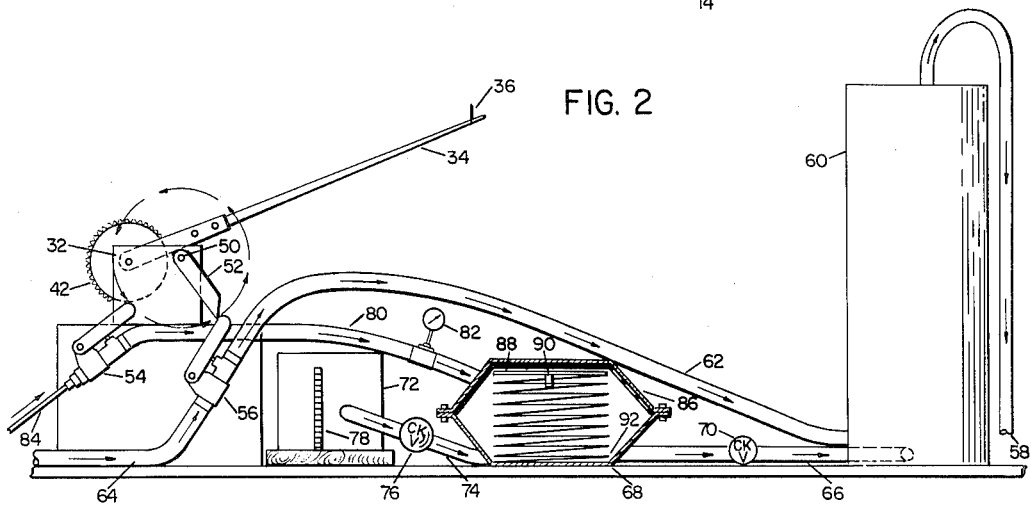
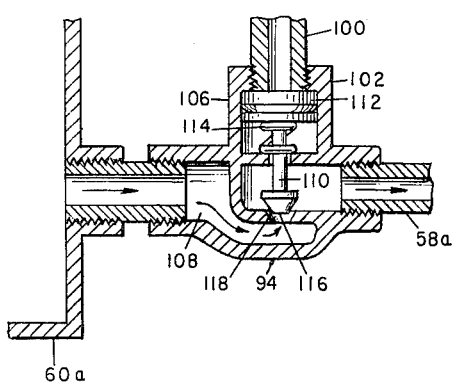
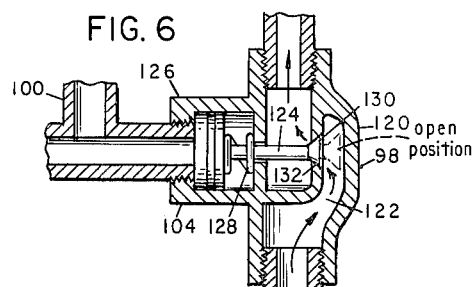
INVENTOR.
OSBORNE W. LE GATE
ALICE C. LE GATE
BY Roy L. Van Winkle
Attorney Feb. 15, 1966   O. W. LE GATE ETAL   3,235,008
WELL TREATING APPARATUS
Filed April 24, 1963   2 Sheets-Sheet 2
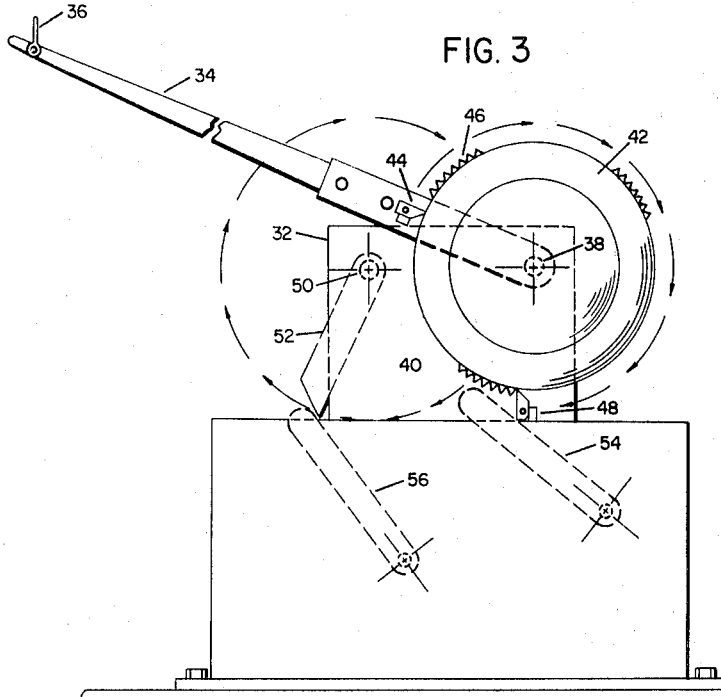
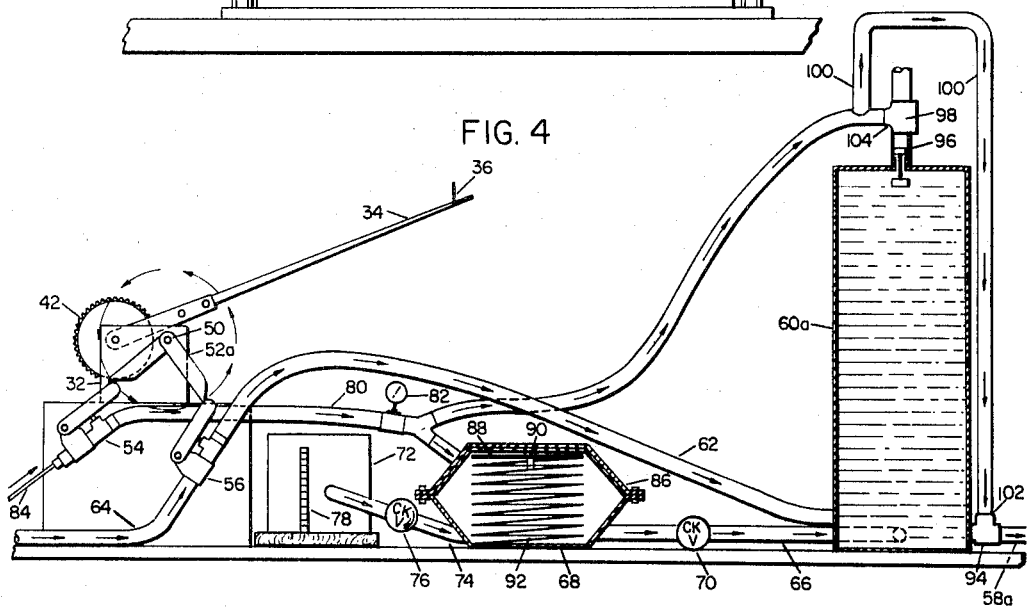
INVENTOR.
OSBORNE W. LE GATE
ALICE C. LE GATE
BY Roy L. Van Winkle
Attorney United States Patent Office 3,235,008
Patented Feb. 15, 1966

3,235,008
WELL TREATING APPARATUS
Osborne W. Le Gate, 44 E. 14th St., Edmond, Okla., and Alice C. Le Gate, 862 W. 124th St., Los Angeles, Calif.
Filed Apr. 24, 1963, Ser. No. 275,291
6 Claims. (Cl. 166—75)

This invention relates generally to improved apparatus for treating oil or gas wells or the like. More specifically, it relates to improved apparatus useful in automatically and intermittently introducing treating materials into oil or gas wells or the like.

In the production of oil from wells, it is well known that the oil produced is most often accompanied by water and gas. Such mixed production presents several difficulties for those attempting to make economical use of the oil and gas. Among the problems encountered, several can be eliminated or at least alleviated to some extent by the introduction of various chemicals into the well. For example, if the oil and water are in the form of an emulsion, suitable chemicals introduced into the well will cause the emulsion to break thus rendering the ultimate separation of the oil and water much less difficult. Also, the water may contain various salts which can deposit on the perforations in the casing through which the well is producing, they may deposit on the pumping apparatus causing valve malfunctions, or they may attack the material from which the pumping apparatus or the casing is manufactured.

In any event, it is highly desirable in areas where conditions such as are exemplified above exist, to be able to introduce materials into the well during the production thereof which will neutralize the adverse conditions. To this end, various devices have been proposed and actually used in the past with various degrees of success. One such device is disclosed in United States Patent No. 2,957,491, issued October 25, 1960, to Charley Lowery.

The present invention contemplates improved apparatus wherein treating materials are automatically and intermittently introduced into an oil or gas well or the like. Such invention involves the use of an intermittent actuation means driven by a well pump. The intermittent actuation means controls the delivery of treating materials and well fluids to a mixing tank wherein the treating materials are mixed with well fluids prior to their return to the well.

This invention also contemplates a modification of the apparatus wherein the treating materials and well fluids, after mixing, are introduced into the well even though the well may be under pressure. Such modification involves in addition to the above the use of a pair of pilot-actuated valves for the purpose of isolating the mixing tank.

One object of this invention is to provide an improved apparatus for introducing treating materials into an oil or gas well or the like.

Another object of this invention is to provide an improved apparatus for introducing treating materials into an oil or gas well or the like wherein said well is under pressure.

A further object of this invention is to provide an improved apparatus for automatically and intermittently introducing treating materials into an oil or gas well or the like.

Other, further, and additional objects and advantages of the invention will become more apparent as the following description is read in conjunction with the accompanying drawing wherein like reference characters denote like parts in all views and wherein:

FIGURE 1 is a view partly in elevation and partly in cross-section of a well, a walking-beam type pump, and a portion of the apparatus of the invention.

FIGURE 2 is an enlarged view partly in elevation and partly in cross-section of apparatus constructed in accordance with the invention.

FIGURE 3 is a greatly enlarged view of a portion of the intermittent actuation mechanism.

FIGURE 4 is a view similar to FIGURE 2, but illustrating a slightly modified form of apparatus also constructed in accordance with the invention.

FIG. 5 is an enlarged cross-sectional view of a normally-open, pilot-actuated valve utilized in the apparatus illustrated in FIG. 4.

FIG. 6 is an enlarged cross-sectional view of a normally-closed, pilot-actuated valve utilized in the apparatus illustrated in FIG. 4.

Referring to the drawing in detail, and first to FIGURE 1, shown therein is a portion of a well 10 having a casing 12 positioned therein. Within the casing 12 is a production tubing 14 and within the production tubing 14 is a pump rod 16. The lowermost end of the rod 16 is attached to a pump (not shown) which moves liquids from the bottom of the well 10 through the tubing 14, through a flow pipe 18 connected therewith to a gathering system (not shown). A pipe 20 is arranged so that it is in communication with the annulus between the casing 12 and tubing 14. Its use will be explained more fully hereinafter. It should be understood that, while not shown, the uppermost end of the casing 12 and tubing 14 would be provided with the required packing glands, wipers, etc., as required.

The upper end of the pump rod 16 is attached to the end of a walking-beam 22 of a well pump 24. The walking-beam 22 is pivotally mounted at 26 on pump supporting legs 28. Actuation of the walking-beam 22 and pump rod 16 is accomplished by means of a motor 30 operably connected with the end of the walking beam-22 opposite to that which the pump rod 16 is attached.

Positioned near the pump 24 is an intermittent actuation mechanism 32. An enlarged view of the mechanism 32 is shown in FIGURE 3. FIGURE 1 illustrates the method in which the mechanism 32 is operated by the walking-beam 22. As shown therein, a ratchet arm 34 is connected by a suitable linkage 36 to the walking-beam 22. The connection is such that up and down movement of the beam 22 about the pivot 26 imparts a similar movement to the ratchet arm 34.

As may be more clearly seen in FIGURE 3, the ratchet arm 34 is pivotally mounted on input shaft 38 of a gear reducer 40. A ratchet wheel 42 is attached to the input shaft 38 in such a manner that rotation of the ratchet wheel 42 also rotates the shaft 38. A ratchet pawl 44 is mounted on the ratchet arm 34 in a position wherein the pawl 44 engages teeth 46 extending around the circumference of the wheel 42. The arrangement is such that an upward movement of the arm 34 will, through the pawl 44 and teeth 46 cause a rotational movement of the wheel 42. A stop pawl 48 is mounted on the reducer 40 and also engages the teeth 46. The stop pawl 48 is provided so that during the downward movement of the arm 34 ratchet wheel 42 is restrained from moving. Naturally, both the pawl 44 and stop pawl 48 are spring-loaded and pivotally mounted so that during upward movement of the arm 34, the stop pawl 48 is disengaged from the teeth 46 and during downward movement of the arm 34 the pawl 44 is disengaged from the teeth 46.

Fixed to the output shaft 50 of gear reducer 40 and rotatable therewith is a cam member 52. The cam 52 is adapted, as it rotates with output shaft 50, to actuate three-way valve 54 and two-way valve 56. Referring briefly to FIGURE 4, a cam 52a shown therein is a modified version of the cam 52. In the service application of the embodiment illustrated in FIGURE 4, both the valves 54 and 56 must be actuated simultaneously. The valves 54 and 56 illustrated in FIGURE 4 could be mounted side-by-side and actuated by a cam 52, but for the purposes of clarification and simplification of the drawing, the modified cam 52a has been shown.

Referring now to FIGURE 2, shown therein is the intermittent actuation mechanism previously described in conjunction with the required apparatus for introducing treating materials into a well which contains little or no pressure. Such apparatus includes an outlet conduit 58 connected a one end with a mixing tank 60 and at the other end with a pipe 20. Arranged in fluid communication with the lower end portion of the tank 60 is a conduit 62. The other end of the conduit 62 is connected with the two-way cam-actuated valve 56. A conduit 64 connects the valve 56 with the flow line 18.

Also connected with the mixing tank 60 is a conduit 66 which has its other end connected with the outlet of a diaphragm-type pump 68. Operably positioned in the conduit 66 is a check valve member 70 which is adapted to permit flow from the pump 68 to the tank 60, but to prevent flow in the opposite direction. At this point, it might be well to mention that while a diaphragm-type pump is preferred, any suitable fluid driven pump could be used.

A treating material supply reservoir 72 is connected with the inlet of the pump 68 by means of a conduit 74. Positioned in the conduit 74 is a check valve 76 which is adapted to permit flow to the pump 68 but to prevent flow in the opposite direction. As illustrated, the supply reservoir 72 is provided with a sight-glass 78 so that the quantity of treating material therein can be easily observed.

A conduit 80 connects the pump 68 with the three-way cam-actuated valve 54. A pressure gauge 82 may be placed in the conduit 80 if desired. Valve 54 is connected with a source of fluid under pressure (not shown) by means of a conduit 84. The source of fluid under pressure (not shown) to which the conduit 84 is connected may be the gas supply which powers the motor 30 or in some installations, wherein the well is producing gas, it may be connected with a receiver (not shown) containing such gas.

The pump 68 includes, generally, two chambers separated by a diaphragm 86. As illustrated, the lower chamber is adapted to receive the treating material to be pumped and the upper chamber is adapted to receive the pressurized fluid used to power the pump 68. A plate 88 is located adjacent the diaphragm 86 in the lower chamber. An adjustable member 90 is mounted on the plate 88, extending downwardly therefrom. The adjustable member 90 is adapted to stop the downward movement of the diaphragm 86, thus controlling the displacement of the pump 68. A spring 92 is arranged to cause the diaphragm 86 to return to its upper position when pressure is released from the top chamber of the pump 68.

The apparatus as illustrated in FIGURE 4 is a modification of the apparatus shown in FIGURE 2. Such modification was necessary in order to be able to effectively introduce treating materials into a well which has pressure therein.

As previously mentioned, the intermittent actuation mechanism 32 is substantially the same as that utilized in the apparatus shown in FIGURE 2. The significant difference being that the cam 52a and valve arrangement is such that both the valves 54 and 56 are actuated simultaneously. The greatest modification of the apparatus exists in the mixing tank and manifold connected therewith. As shown in FIGURE 4, a conduit 58a connects the lower end portion of a mixing tank 60a with the pipe 20. Operably located in the conduit 58a is a normally-open, pilot-actuated valve 94. Mounted in the upper end of the mixing tank 60a is a normally-open float valve 96 adapted to close when the fluid level in the tank 60a reaches a predetermined value, thus preventing the tank 60a from overflowing. Mounted in fluid communication with the float valve 96 is a normally-closed, pilot-actuated valve 98. A conduit 100 connects the pilot port 102 of the valve 94 with the pilot port 104 of the valve 98 and each with the conduit 80. The arrangement is such that opening of the valve 54 actuates the pump 68, opens the normally-closed valve 98, and closes the normally-open valve 94.

The pilot-actuated valves 94 and 98 are commercially available from many sources and their specific construction will depend upon the particular type selected. As illustrated clearly in FIG. 5, the normally-open, pilot-actuated valve 94 includes a valve body 106 having a flow passageway 108 extending therethrough. A valve member 110 is movably positioned in the valve body 106 and has a piston 112 on the upper end thereof exposed to the fluid pressure in the conduit 100. The spring 114 is arranged to bias the valve member 110 upwardly against the force exerted by fluid in the conduit 100, holding a valve closure portion 116 on the lower end of the valve member 110 away from a seat 118 formed in the valve body 106 and defining a flow aperture in the passageway 108. As can be appreciated from viewing the structure of the valve 94 illustrated in FIG. 5, the flow passage way 108 remains open until such time as the pressure in the conduit 100 is sufficiently high to force the valve member 110 downwardly forcing the valve closure portion 116 into engagement with the heat 118, closing the normally-open, pilot-actuated valve 94.

FIG. 6 illustrates in greater detail, the normally-closed, pilot-actuated valve 98. As shown therein, the valve 98 includes a valve body 120 having a flow passageway 122 extending therethrough. A valve member 124 is movably positioned in the valve body 120 and includes a piston 126 having one end thereof exposed to the fluid pressure in the conduit 100. The spring 128 encircles the valve member 124, biasing the piston 126 relatively toward the conduit 100 and moving a valve closure portion 130 on the valve member 124 into engagement with a valve seat 132 formed in the valve body 120 and defining an aperture in the flow passageway 122. As can be seen in FIG 6, the valve 98 is held in a position closing the flow passageway 122 by the spring 128 until fluid pressure in the conduit 100 is sufficiently high to force the valve closure portion 130 away from the seat 132, thereby opening the flow passageway 122 through the valve 98.

As can be seen by comparing FIGURE 4 with FIGURE 2, the remaining components of the apparatus are identical to those previously described in connection with FIGURE 2.

The operation of the apparatus illustrated in FIGURE 2 is connected directly with the operation of the walking-beam 22. As the beam 22 moves up and down, the ratchet arm 34 is actuated through the linkage 36 imparting a rotational movement to the input shaft 38 through the ratchet wheel 42 as described in connection with FIGURE 3. The rotation of the input shaft 38 results in a proportional but considerably reduced rotational movement of the output shaft 50 and the cam 52.

As the cam 52 rotates, the three-way valve 54 is opened and fluid under pressure passes from conduit 84, through valve 54 and conduit 80 into the pump 68. The fluid forces the diaphragm 86 and plate 88 downwardly compressing the spring 92 until the adjustable member 90 arrests their downward movement. Treating materials in the pump 68 are driven through the conduit 66 and check valve 70 into the mixing tank 60. The materials are prevented from moving toward the reservoir 72 because the check valve 76 closes against the pressure exerted by the pump 68. The volume of material displaced by the pump 68 is determined by the travel of the diaphragm 86. The travel of the diaphragm 86 is controlled by the adjustable member 90, therefore only a measured quantity of treating material is displaced into the mixing tank 60.

When the cam 52 releases the valve 54 allowing it to close, the fluids holding the diaphragm 86 down are vented therethrough. Upon release of this pressure, the spring 92 returns the diaphragm 86 to its initial position. The upward movement of the diaphragm 86 allows the materials from the reservoir 72 to open the check valve 76 and pass through the conduit 74 into the pump 68. The pump 68 is then ready for the next pumping cycle.

Continued rotation of the cam 52 then actuates or opens the two-way valve 56 which permits well fluids from the flow line 18 and conduit 64 to enter conduit 62 through which it reaches the mixing tank 60. The reduction of the gear reducer 40 is selected so that the cam 52 is moving very slowly thus holding the valve 56 open for a considerable length of time. Such time being sufficient for the mixing tank to overflow with the mixed treating material and well fluids whereby the mixture flows through the conduit 58 into the return pipe 20. The mixture then enters the annulus between the casing 12 and well tubing 14 and flows downwardly in the well 10 where it mixes with the well fluids being subsequently displaced upwardly by the well pump (not shown). It should be apparent that the above cycle results in the treating materials reaching all portions of the well 10. The specific results of such procedure will depend upon the specific treating material used.

The operation of the apparatus illustrated in FIGURE 4 varies slightly from that of the apparatus of FIGURE 2 because of the necessity of equalizing the pressure in the mixing tank 60a with that in the well 10. Such equalizing of the pressures is required so that the treating materials in the tank 60a can flow therefrom through conduit 58a and return pipe 20 into the well 10.

The ratchet arm 34 is actuated by the walking-beam 22 through the linkage 36. This actuation is converted into a rotational movement of the output shaft 50 by the ratchet wheel 42 and gear reducer 40. Attached to the output shaft 50 is the cam 52a which, due to the action of the gear reducer 40, is rotating very slowly. The cam 52a actuates or opens the three-way valve 54 and the two-way 56 simultaneously. As a result of the opening of the valve 54, pressure is applied to the pump 68 through conduit 80 driving the diaphragm 86 and plate 88 downwardly compressing the spring 92 until such downward movement is arrested by the adjustable member 90. As the diaphragm 86 moves downwardly, treating materials in the pump 68 are discharged through the conduit 66 and check valve 70 into the mixing tank 60. At the same time, the pressure in the conduit 80 enters conduit 100 and the pilot ports 102 and 104 of the valves 94 and 98, respectively. With pressure thus applied, the normally-open valve 94 is closed and the normally-closed valve 96 is opened as previously described in connection with the detailed description of FIGS. 5 and 6. This results in the mixing tank 60a being isolated from the pressure in the well 10 by the now closed valve 94 and being vented to the atmosphere by hte now open valve 98. Such isolating and venting are required to permit the proper entrance and mixing of the treating materials and well fluids (through the valve 56 and conduit 62) into the mixing tank 60a.

The float valve 96 is provided so that when the fluid level is low in the mixing tank 60a, it will open and allow venting of the tank 60a through the valve 98. Float valve 96 is so constructed that it closes when the fluid level in the tank 60a reaches a predetermined level, thus preventing the overflow of the tank 60a.

Upon completion of the filling and mixing cycle, that is, when the cam 52a releases or allows the valves 54 and 56 to close, the conduits 80 and 100 are vented through the three-way valve 54 releasing the pressure therein. As a result of the cam 52a releasing the valves 54 and 56 the normally-open valve 94 returns to its open position and the normally-closed valve 98 closes.

With the valves 94 and 98 in this position, the tank 60a is open through conduit 58a and return pipe 20 to the annulus of the well 10. Under such conditions, the pressure equalizes in the tank 60a and well 10 allowing the mixture to flow by gravity into the well 10.

Releasing the valve 54 also releases the pressure on the diaphragm 86 of the pump 68. The spring 92 returns the diaphragm 86 to its upper position allowing the treating materials in the reservoir 72 to flow into the pump 68. The apparatus is now ready to repeat the treating cycle.

The length of time between the introduction of treating materials into the well depends directly upon the number of operations of the walking-beam 22. Several variable features are incorporated into apparatus. For example, the volume of the pump 68 can be varied to change the quantity of treating materials displaced into the mixing tank 60 or 60a. The frequency of the treating cycle can be varied by changing the ratio of the gear reducer 40. Naturally, if frequent variations in the cycle are desired or required a variable-speed reducer could be used instead of a fixed ratio reducer. The quantity of well fluid mixed with the treating material can also be varied by changing the configuration cam 50 or 50a so that the valve 56 is open for varying lengths of time.

It should be apparent that apparatus constructed in accordance with this invention provides many new and novel features not heretofore available in apparatus for treating oil and gas wells. One feature of the invention is that, where sufficient well-head pressure is available, the well itself provides the motive power for driving the pump 68. The apparatus of this invention operates automatically and the quantity and quality of the treating mixtures desired are readily and easily obtained. It should also be pointed out that no treating materials are introduced unless the well pump is in operation.

Having described the invention in terms of specific embodiments, it should be apparent that they are by way of example only and that many modifications and variations can be made therein without departing from the spirit of the invention or the scope of the annexed claims.

What we claim is:

1. In apparatus for introducing treating materials into oil or gas wells or the like, said wells having an annulus therein between the wall or casing of said well and production tubing positioned therein, said apparatus including,
   (1) a treating material reservoir,
   (2) pump means provided with an inlet and an outlet, and having said inlet connected with said reservoir,
   (3) a mixing tank connected with said outlet and with said annulus,
   (4) a source of pressurized fluid,
   (5) intermittent actuation means including,
      (a) first valve means connected with said mixing tank and with said production tubing,
      (b) second valve means connected with said source of pressurized fluid and with said pump means,
      (c) a cam member rotatably thereon adapted to periodically open said first and second valve means, and
   (6) driving means operably connected with said intermittent actuation means, the arrangement and construction being such that operation of said driving means results in the rotation of said cam means.

2. In apparatus for introducing treating materials into oil or gas wells or the like, said wells having an annulus therein between the wall or casing of said well and production tubing positioned therein, said apparatus including, (1) a treating meaterial reservoir,
(2) pump means including,
 (a) a diaphragm member dividing said pump into a pair of chambers,
 (b) an inlet and an outlet in one of said chambers,
(3) first conduit means connecting said linet with said reservoir,
(4) a mixing tank having an inlet connected with said pump outlet and an outlet connected with said annulus,
(5) a source of pressurized fluid,
(6) second conduit means connecting said source of pressurized fluid with the other chamber of said pump,
(7) intermittent actuation means including,
 (a) an input shaft and an output shaft rotatably mounted therein,
 (b) ratchet means operably connected with said input shaft and adapted to cause the rotation thereof,
 (c) first valve means mounted on said intermittent actuation means and connected with said mixing tank and with said production tubing,
 (d) second valve means mounted on said intermittent actuation means and operably located in said second conduit means,
 (e) cam means mounted on said output shaft and rotable therewith, said cam means being adapted to periodically open said first and second valve means, and
(8) driving means operably connected with said ratchet means, the arrangement being such that operation of said driving means results in the rotation of said cam means.

3. In the apparatus of claim 2, wherein said driving means includes,
(1) a member pivotally mounted for oscillatory movement,
(2) connecting means joining said member with said ratchet means whereby said movement is transferred to said ratchet means, and
(3) means for imparting said oscillatory movement to said member.

4. In the apparatus of claim 2, wherein said mixing tank also includes,
(1) venting means comprising,
 (a) means forming an opening in the upper end of said mixing tank,
 (b) float valve means mounted therein adapted to close when the fluid in said tank reaches a predetermined level,
 (c) normally-closed, pilot-actuated valve means mounted therein above said float-valve means and having a pilot port therein connected with said second conduit means,
(2) normally-open, pilot-actuated outlet valve means located between said mixing tank outlet and said annulus and having a pilot port therein connected with said second conduit means,
and wherein said cam means is arranged and constructed to actuate said first and second valve means simultaneously.

5. In apparatus for introducing treating materials into oil or gas wells or the like wherein said well is provided with production tubing located within the wall or casing said well forming an annulus therein and wherein said well is provided with a subsurface pump actuated by a walking-beam member, the invention comprising:
(1) a treating material reservoir,
(2) pump means including,
 (a) a diaphragm member dividing said pump into upper and lower chambers,
 (b) a spring member biasing said diaphragm in one direction,
 (c) an adjustable stop member mounted for movement with said diaphragm and adapted to limit said movement in the direction opposite the direction of said spring bias,
 (d) means forming an inlet and an outlet in said lower chamber,
 (e) a first check valve member adapted to permit flow through said inlet to said pump but to prevent flow in the opposite direction,
 (f) a second check valve member adapted to permit flow through said outlet from said pump but to prevent flow in the opposite direction,
(3) first conduit means connecting said inlet with said reservoir,
(4) a source of pressurided fluid,
(5) second conduit means connecting said source of pressurized fluid with said upper chamber in said pump,
(6) a mixing tank having
 (a) an inlet connected with said pump outlet,
 (b) an outlet connected with said annulus, and
(7) intermittent actuation means including,
 (a) speed-reduction means having an input shaft and an output shaft rotatably mounted therein,
 (b) ratchet means operably connected with said input shaft and adapted to cause the rotation thereof and having an arm thereon connected with said walking-beam,
 (c) normally-closed two way valve means mounted on said intermitent actuation means and connected with said mixing tank and said production tubing,
 (d) normally-closed, three way valve means mounted on said intermittent actuation means and operably located in said second conduit means,
 (e) cam means mounted on said output shaft and rotable therewith, said cam means being adapted to periodically open said two-way and three-way valve means.

6. In apparatus for introducing treating materials into oil or gas wells or the like wherein said well is provided with production tubing located within the wall or casing of said well forming an annulus therein and wherein said well is provided with a subsurface pump actuated by a walking-beam member, the invention comprising:
(1) a treating material reservoir,
(2) pump means including,
 (a) a diaphragm member dividing said pump into upper and lower chambers,
 (b) a spring member biasing said diaphragm in one direction,
 (c) an adjustable stop member mounted for movement with said diaphragm and adapted to limit said movement in the direction opposite the direction of said spring bias,
 (e) a first check valve member adapted to permit flow through said inlet to said pump but to prevent flow in the opposite direction,
 (f) a second check valve member adapted to permit flow through said outlet from said pump but to prevent flow in the opposite direction,
(3) first conduit means connecting said inlet with said reservoir,
(4) a source of pressurized fluid,
(5) second conduit means connecting said source of pressurized fluid with said upper chamber in said pump,
(6) a mixing tank having
 (a) an inlet connected with said pump outlet,
 (b) an outlet connected with said annulus,
 (c) venting means including (i) means forming an opening in the upper end of said tank, (ii) normally-open, float-valve means mounted therein adapted to close when the fluid in said tank reaches a predetermined level, (iii) normally-closed, pilot-actuated valve means mounted therein above said float-valve means and having a pilot port therein connected with said second conduit means, (d) normally-open, pilot-actuated outlet valve means located between said mixing tank oulet and said annulus and having a pilot port therein connected with said second conduit means, and (7) intermittent actuation means including, (a) speed-reduction means having an input shaft and an output shaft rotatably mounted therein, (b) ratchet means operably connected with said input shaft and adapted to cause the rotation thereof and having an arm thereon connected with said walking-beam, (c) normally-closed two-way valve means mounted on said intermittent actuation means and connected with said mixing tank and said production tubing, (d) normally-closed, three-way valve means mounted on said intermittent actuation means and operably located in said second conduit means, (e) cam means mounted on said output shaft and rotatable therewith, said cam being adapted to periodically open said two-way and three-way valve means simultaneously.

References Cited by the Examiner

UNITED STATES PATENTS 2,163,436  6/1939  Raymond et al. ____ 166—74 X
2,773,551  12/1956  Warden et al. _____ 166—75

JACOB L. NACKENOFF, *Primary Examiner.*

CHARLES E. O'CONNELL, *Examiner.*

J. LEPPINK, *Assistant Examiner.*

UNITED STATES PATENT OFFICE
CERTIFICATE OF CORRECTION

Patent No. 3,235,008                            February 15, 1966

Osborne W. Le Gate et al.

It is hereby certified that error appears in the above numbered patent requiring correction and that the said Letters Patent should read as corrected below.

Column 3, line 11, for "a one end" read -- at one end --; column 4, line 29, for "heat" read -- seat --; column 6, line 64, after "rotatably" insert -- mounted --; column 8, between lines 59 and 60, insert the following (d) means forming an inlet and an outlet
            in said lower chamber, Signed and sealed this 31st day of January 1967.

(SEAL)
Attest:

ERNEST W. SWIDER                               EDWARD J. BRENNER
Attesting Officer                                  Commissioner of Patents